United States Patent
Yoo et al.

(10) Patent No.: US 10,968,237 B2
(45) Date of Patent: Apr. 6, 2021

(54) METHOD FOR CONTINUOUS PRODUCTION OF TETRAALKOXYSILANE

(71) Applicant: KOREA INSTITUTE OF SCIENCE AND TECHNOLOGY, Seoul (KR)

(72) Inventors: Bok Ryul Yoo, Seoul (KR); Daejin Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/861,300

(22) Filed: Apr. 29, 2020

(65) Prior Publication Data
US 2020/0339609 A1 Oct. 29, 2020

(30) Foreign Application Priority Data
Apr. 29, 2019 (KR) .......................... 10-2019-0050123

(51) Int. Cl.
*C07F 7/02* (2006.01)
*B01J 31/12* (2006.01)

(52) U.S. Cl.
CPC ............. *C07F 7/025* (2013.01); *B01J 31/122* (2013.01)

(58) Field of Classification Search
CPC ...... C07F 7/00; C07F 7/04; C07F 7/045; B01J 31/122
See application file for complete search history.

(56) References Cited

U.S. PATENT DOCUMENTS

| | | | | |
|---|---|---|---|---|
| 4,211,717 A * | 7/1980 | Emblem | .................. | C07F 7/045 556/470 |
| 4,288,604 A * | 9/1981 | Magee | ..................... | C07F 7/045 556/470 |
| 4,289,889 A * | 9/1981 | Herdle | ..................... | C07F 7/04 556/470 |
| 4,752,647 A * | 6/1988 | Inaba | ........................ | C07F 7/04 556/470 |
| 4,762,939 A * | 8/1988 | Mendicino | ............. | C07F 7/025 556/470 |
| 5,177,234 A * | 1/1993 | Nguyen | .................. | C07F 7/045 556/470 |
| 6,191,296 B1 * | 2/2001 | Dittrich | ..................... | C07F 7/04 556/470 |
| 6,734,133 B1 * | 5/2004 | Weisbeck | ............... | B01J 31/122 502/119 |
| 9,156,861 B2 * | 10/2015 | Yang | ........................ | C07F 7/025 |
| 2007/0073076 A1 * | 3/2007 | Lewis | ..................... | C07F 7/025 556/482 |
| 2013/0184483 A1 * | 7/2013 | Laine | ........................ | C07F 7/07 556/464 |

FOREIGN PATENT DOCUMENTS

| CN | 101041668 A | * 9/2007 | |
|---|---|---|---|
| GB | 2140814 A | * 12/1984 | .............. C07F 7/045 |

OTHER PUBLICATIONS

CAS Abstract Q. Xu et al., CN 101041668 (2007) (Year: 2007).*
CAS Abstract RN 38321-18-5 (1984) (Year: 1984).*
English-Language Machine Translation CN 101041668 (2007) (Year: 2007).*

* cited by examiner

*Primary Examiner* — Alexander R Pagano
(74) *Attorney, Agent, or Firm* — Rabin & Berdo, P.C.

(57) ABSTRACT

A method for producing tetraalkoxysilane includes reacting a compound represented by Chemical Formula 1 below with an alkali metal at a molar ratio ranging from 1.0:1.0 to 1.0:1.1 and in the absence of a solvent to produce a basic catalyst represented by Chemical Formula 2 below; and mixing the basic catalyst represented by Chemical Formula 2, silicon metal, and an alcohol represented by Chemical Formula 3 below to produce tetraalkoxysilane:

Chemical Formula 1
$R_1O(CHR_2CH_2O)_n-H$,

Chemical Formula 2
$R_1O(CHR_2CH_2O)_n-M$, and

Chemical Formula 3
$R_3OH$, where M is alkali metal, $R_1$ represents a C1-C5 linear hydrocarbon group or a C3-C5 branched hydrocarbon group, $R_2$ represents H or a C1-C3 linear hydrocarbon group, $R_3$ represents a C1-C2 alkyl group, and n is an integer of 2-3. Thus, it is possible to increase the proportion of the catalyst in the process, and to minimize production of impurities caused by solvent decomposition.

11 Claims, 4 Drawing Sheets

METHOD FOR CONTINUOUS PRODUCTION OF TETRAALKOXYSILANE

CROSS-REFERENCE TO RELATED APPLICATIONS

This application claims, under 35 U.S.C. § 119, the priority of Korean Patent Application No. 10-2019-0050123 filed on Apr. 29, 2019 in the Korean Intellectual Property Office, the disclosure of which is incorporated herein by reference in its entirety.

TECHNICAL FIELD

The present disclosure relates to a method for continuous production of tetraalkoxysilane. More particularly, the present disclosure relates to a method for continuous production of tetraalkoxysilane with high yield.

BACKGROUND

Tetraalkoxysilane has been used widely in various industrial fields ranging from preparation of silica particles, inorganic materials thereof and organic polymer composites thereof to adhesives, hard coating agents, etc.

Tetraalkoxysilane may be obtained by the dehydrochlorinative alkoxylation of tetrachlorosilane with alcohol or by the direct reaction of silicon metal with alcohol in the presence of an alkali catalyst.

The former method for the production of tetraethoxysilane is now commercialized, but provides undesired acidic HCl as a byproduct. Moreover, HCl undergoes a reaction with alcohol to give water and chloroalkane as byproducts. Therefore, acidic HCl should be neutralized with base under inert condition as soon as possible and then removed in salt form. It is required for additional processes such as neutralization and filtration making cost-expensive steps.

Therefore, a method for preparing tetraalkoxysilane in large scale at low cost is drawing a lot of attentions.

U.S. Pat. No. 9,156,861 discloses a method for producing alkoxysilane through direct reaction of silicon metal with alcohol in the presence of a copper catalyst. However, the US patent has a disadvantage in that the main product is trialkoxysilane and only a small amount of tetraalkoxysilane can be obtained.

REFERENCES

Patent Documents

U.S. Pat. No. 9,156,861.
U.S. Pat. No. 5,177,234.
U.S. Pat. No. 4,762,939.

SUMMARY

The present discloses a method for continuous production of tetraalkoxysilane through direct reaction of silicon metal with alcohol.

In one aspect of the present disclosure, there is provided a method for producing tetraalkoxysilane, including the steps of:

1) reacting a compound represented by the following Chemical Formula 1 with alkali metal to produce a basic catalyst represented by the following Chemical Formula 2; and 2) mixing the basic catalyst represented by the following Chemical Formula 2, silicon metal and alcohol represented by the following Chemical Formula 3 to produce tetraalkoxysilane continuously:

$R_1O(CHR_2CH_2O)_n-H$     [Chemical Formula 1]

$R_1O(CHR_2CH_2O)_n-M$     [Chemical Formula 2]

$R_3OH$     [Chemical Formula 3]

wherein M is alkali metal, $R_1$ represents any one selected from C1-C5 linear hydrocarbon groups and C3-C5 branched hydrocarbon groups, $R_2$ represents any one selected from H and C1-C3 linear hydrocarbon groups, $R_3$ represents any one selected from C1-C2 alkyl groups, and n is an integer of 2-3.

According to an embodiment of the present disclosure, in Chemical Formula 1 or 2, $R_1$ may represent any one selected from C1-C3 alkyl groups, and $R_2$ may represent any one selected from H and C1-C3 alkyl groups.

According to another embodiment of the present disclosure, in Chemical Formula 1 or 2, and n may be 2.

In step 1), the compound represented by Chemical Formula 1 and the alkali metal may be mixed at a molar ratio of 1.0:1.0-1.1.

According to still another embodiment of the present disclosure, in step 1), the compound represented by Chemical Formula 1 and the alkali metal may be mixed at a molar ratio of 1:1.

According to still another embodiment of the present disclosure, step 1) may be carried out at a temperature of 100-190° C. for 1-20 hours.

According to still another embodiment of the present disclosure, the alkali metal may be any one selected from Li, Na and K.

According to still another embodiment of the present disclosure, the silicon metal may be used after reducing and removing oxides ($SiO_x$) present on the surface thereof by treating with a mixed gas containing at least one selected from mixtures of hydrogen gas with inert gas (argon gas or nitrogen gas) under the condition of 400-600° C.

According to still another embodiment of the present disclosure, the reduction step may be carried out for 2-5 hours.

According to still another embodiment of the present disclosure, $R_1$ of the basic catalyst represented by Chemical Formula 2 may be the same as $R_3$ of the alcohol represented by Chemical Formula 3.

According to still another embodiment of the present disclosure, step 2) may be carried out at a temperature of 140-185° C.

According to yet another embodiment of the present disclosure, step 1) and step 2) may be carried out under inert atmosphere, and the inert atmosphere may be formed with argon gas or nitrogen gas.

According to the present disclosure, it is possible to produce tetraalkoxysilane continuously using a single production apparatus.

In addition, according to the present disclosure, a basic catalyst is prepared in the absence of a solvent and then used in the reaction for the production of tetraalkoxysilane, the proportion of the catalyst is high and the formation of byproducts due to solvent decomposition can be minimized. Further, it is possible to improve reaction efficiency and simplify a purification process as compared to the method based on direct reaction according to the related art. As a result, tetraalkoxysilane can be produced with significantly higher cost efficiency as compared to the related art.

DETAILED DESCRIPTION OF EMBODIMENTS

Exemplary embodiments now will be described more fully hereinafter. The present disclosure may, however, be embodied in many different forms and should not be construed as limited to the exemplary embodiments set forth therein. It will be understood that various changes, equivalents and substitutes within the scope of the disclosure will become apparent to those skilled in the art from this detailed description. In description of drawings, similar elements are represented by similar drawing numerals. The terms, such as 'first', 'second', etc., may be used for describing various elements but the elements are not limited to such terms.

The terms, such as 'first', 'second', etc., are used only for the purpose of differentiation of one element from another element. The terms used herein are for the purpose of describing particular embodiments only and is not intended to be limiting of the present disclosure. As used herein, the singular forms "a", "an" and "the" are intended to include the plural forms as well, unless the context clearly indicates otherwise.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise stated, the terms used herein, including technical and scientific terms, have the same meanings as understood by those skilled in the art. The terms as defined in general dictionaries should be interpreted based on the meanings and concepts corresponding to technical aspects of the present disclosure. Unless otherwise stated, the terms should not be interpreted as ideal or excessively formal meanings.

Exemplary embodiments now will be described more fully hereinafter with reference to the accompanying drawings, in which exemplary embodiments are shown.

Figure 1:
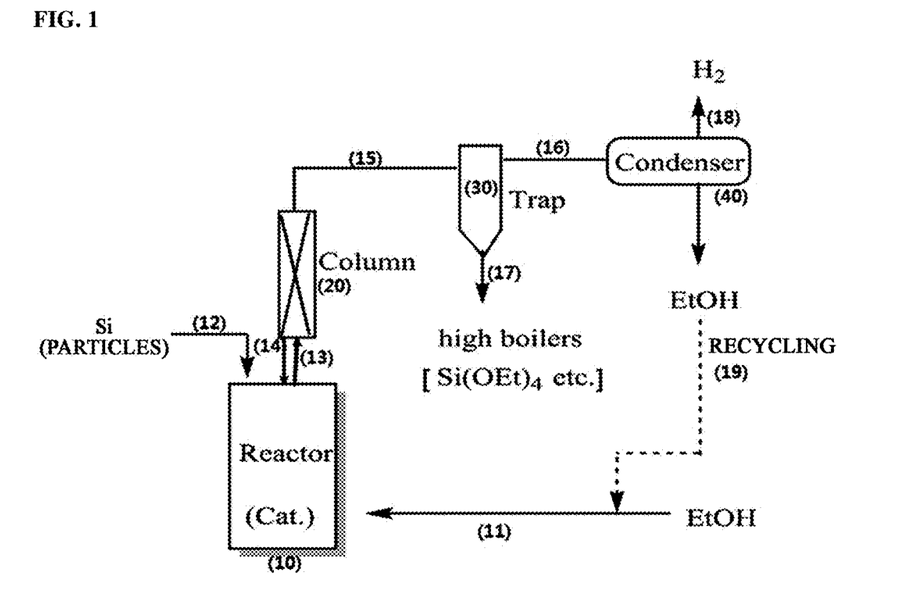
FIG. 1 shows a flow chart illustrating the method for producing tetraalkoxysilane according to the present disclosure.

FIG. 1 is a schematic flow chart illustrating a process for continuous production of tetraalkoxysilane.

As shown in FIG. 1, the present disclosure relates to a method for continuously producing tetraalkoxysilane through direct reaction of silicon metal with alcohol by using a basic catalyst. According to the related art, since a solvent is used for preparing a basic catalyst, byproducts are produced excessively in addition to tetraalkoxysilane, and thus high-purity tetraalkoxysilane cannot be obtained. In addition, since an additional step of purifying the basic catalyst is required after preparing the basic catalyst, it is difficult to produce tetraalkoxysilane continuously. Therefore, in the present disclosure, a basic catalyst is prepared in the absence of a solvent and the basic catalyst is used to carry out direct reaction of silicon metal with alcohol, thereby producing tetraalkoxysilane. In other words, the present disclosure provides a continuous process for producing tetraalkoxysilane with high purity and high yield by effectively controlling the reactions occurring during direct reaction of tetraalkoxysilane.

In one aspect of the present disclosure, there is provided a method for producing tetraalkoxysilane, including the following steps of:
1) reacting a compound represented by the following Chemical Formula 1 with alkali metal to produce a basic catalyst represented by the following Chemical Formula 2; and
2) mixing the basic catalyst represented by the following Chemical Formula 2, silicon metal and alcohol represented by the following Chemical Formula 3 to produce tetraalkoxysilane continuously:

$R_1O(CHR_2CH_2O)_n$—H    [Chemical Formula 1]

$R_1O(CHR_2CH_2O)_n$-M    [Chemical Formula 2]

$R_3OH$    [Chemical Formula 3]

wherein M is alkali metal,
$R_1$ represents any one selected from C1-C5 linear hydrocarbon groups and C3-C5 branched hydrocarbon groups,
$R_2$ represents any one selected from H and C1-C3 linear hydrocarbon groups,
$R_3$ represents any one selected from C1-C2 alkyl groups, and
n is an integer of 2-3.

The apparatus according to the present disclosure includes a reactor 10, a separation unit 20, a recovery unit 30 and a condenser unit 40.

Step 1) is advantageous in that it is carried out continuously in a single reactor 10. The basic catalyst is stored in the reactor 10 or is prepared in the reactor 10, a reaction mixture is discharged from the reactor 10 through a first conveying line 13, and alcohol and silicon metal are supplied to the reactor 10 through a first supplying line 11 and a second supplying line 12, respectively.

The reactor 10 may be a single-stage or multi-stage mixing reactor equipped with an agitator and suitable for a continuous process.

First, the basic catalyst is prepared directly from the reactor 10, and then alcohol and silicon metal are supplied to the reactor 10 and undergo reaction for synthesis of tetraalkoxysilane together with the basic catalyst.

The basic catalyst may be prepared as a basic catalyst represented by the above Chemical Formula 2 by mixing a compound represented by the above Chemical Formula 1 with alkali metal. Particularly, the compound represented by Chemical Formula 1 is supplied to the reactor 10 through the first supplying line 11, and then alkali metal is supplied thereto so that they react under inert atmosphere to obtain a basic catalyst represented by Chemical Formula 2, as depicted in the following Reaction Scheme 1:

$R_1O(CHR_2CH_2O)_n$—H+M→$R_1O(CHR_2CH_2O)_n$-M+ 1/2H$_2$    [Reaction Scheme 1]

wherein M is alkali metal, $R_1$ represents any one selected from C1-C5 linear hydrocarbon groups and C3-C5 branched hydrocarbon groups, $R_2$ represents any one selected from H and C1-C3 linear hydrocarbon groups, $R_3$ represents any one selected from C1-C2 alkyl groups, and n is an integer of 2-3.

As shown in Reaction Scheme 1, the compound represented by Chemical Formula 1 reacts with the alkali metal under inert atmosphere in the reactor 10 to produce the basic catalyst represented by Chemical Formula 2. Hydrogen gas produced in the process is discharged through a second outlet 18 by way of the first conveying line 13, the second conveying line 15 and the third conveying line 16 connected to the top of the reactor 10.

According to the related art, the basic catalyst used for synthesis of tetraalkoxysilane is prepared using a solvent, and thus causes decrease in yield and purity, resulting in a problem of a need for carrying out fine fractional distillation. However, according to the present disclosure, the basic catalyst represented by Chemical Formula 2 is prepared without addition of a solvent or other materials. Thus, it is possible to obtain a basic catalyst having a controlled structure without alkyl group substitution. In addition, since the resultant catalyst contains no impurities, it does not affect the yield or purity of tetraalkoxysilane, even when silicon metal and alcohol are introduced directly thereto to obtain tetraalkoxysilane. As a result, the present disclosure is advantageous in that it can reduce the number of processing steps significantly.

In addition, the basic catalyst is very suitable for ensuring catalytic activity and process flexibility in the reaction of silicon metal with alcohol.

If the basic catalyst represented by Chemical Formula 2 is prepared by the conventional process using a solvent, not by the method as disclosed herein, excessive amount of byproducts are incorporated even when the same compound represented by Chemical Formula 1 and alkali metal are used. Thus, it is required to carry out a thorough purification step. The additional step adversely affects the cost effectiveness of production.

In Chemical Formula 1 or 2, $R_1$ may represent any one selected from C1-C5 linear alkyl groups, alkoxyl groups, hydroxyl group and substituted amino groups, wherein each substituent may independently represent any one selected from C1-C5 alkoxy groups and alkyl groups. In addition, $R_2$ represents any one selected from H, C1-C3 alkyl groups, alkoxyl groups, hydroxyl group and substituted amino groups, wherein each substituent may independently represent any one selected from C1-C3 alkoxy groups and alkyl groups.

More specifically, $R_1$ may represent any one selected from C1-C3 alkyl groups, and $R_2$ may represent any one selected from H and C1-C3 alkyl groups. In this case, there is an advantage in that the basic catalyst provides maximized processing efficiency.

In addition, when $R_1$ represents any one selected from methyl, ethyl, propyl and butyl groups and $R_2$ represents H, the basic catalyst may be produced effectively and the reaction rate may be increased.

Further, in terms of controlling the reaction temperature, it is preferred that the number of carbon atoms in $R_1$ is equal to or larger than the number of carbon atoms in $R_3$. It is more preferred that $R_1$ is the same as $R_3$, since the production of byproducts is minimized in this case.

In Chemical Formula 1 or 2, it is most preferred that n is 2. As the molecular weight of Chemical Formula 1 or 2 is decreased, the decomposition or deformation of the basic catalyst is prevented and the production of byproducts may be reduced significantly.

Step 1) may be carried out by adding the compound represented by Chemical Formula 1 and the alkali metal to the reactor 10 at the same time, or by introducing the compound represented by Chemical Formula 1 and then adding the alkali metal sequentially.

Since the reaction of step 1) is an exothermic reaction, it is preferred for the sake of safety that the compound represented by Chemical Formula 1 is introduced and then the alkali metal is introduced slowly thereto.

The compound represented by Chemical Formula 1 and the alkali metal may be mixed at a molar ratio of 1.0:1.0-1.1, specifically 1:1. When the mixing molar ratio of the compound represented by Chemical Formula 1 to the alkali metal is less than 1:1, a large amount of byproducts are produced because unreacted compound represented by Chemical Formula 1 remains. Thus, even when the other conditions are the same, it is difficult to obtain tetraalkoxysilane with the same yield and high purity. Particularly, when byproducts are incorporated, there is a problem in that cost efficiency is decreased due to increased cost for purification of tetraalkoxysilane. Moreover, unreacted compound represented by Chemical Formula 1 causes side reactions during the subsequent reaction, resulting in the problem of decrease in processing time in continuous production of alkoxysilane due to the production of byproducts.

When the compound represented by Chemical Formula 1 and the alkali metal are mixed at a molar ratio of 1:1.1, an excessive amount of the metal remains and is converted into a stable material during the subsequent reaction, which does not significantly affect the preparation of tetraalkoxysilane.

However, it is preferred that the alkali metal is used in equimolar or slightly excess amount in the reaction between the compound represented by Chemical Formula 1 and the alkali metal. When the molar ratio exceeds 1:1.1, the final yield of tetraalkoxysilane may be reduced because unreacted alkali metal is increased. Thus, it is most preferred that the excessive molar ratio of alkali metal is 10% or less.

In addition, when the compound represented by Chemical Formula 1 and the alkali metal are mixed at a molar ratio of 1:1 without any solvent, it is possible to obtain the compound represented by Chemical Formula 2 with higher yield and less byproducts. Consequently, tetraalkoxysilane can be produced continuously without an additional step by directly introducing the precursor of tetraalkoxysilane to the reactor 10.

Specifically, step 1) may be carried out in a sealed space shut off from the external air. In addition, it is preferred that the sealed space is under inert atmosphere. The inert atmosphere may be filled with argon gas or nitrogen gas.

Step 1) may be carried out at a temperature of 100-190° C. for 1-20 hours. Specifically, step 1) may be carried out at a temperature of 120-150° C. for 5-15 hours. When step 1) is carried out at a temperature below 100° C., there is a problem in that reaction time is increased. In addition, when step 1) is carried out at a temperature higher than 190° C., the basic catalyst may be decomposed. Thus, it is preferred that step 1) is carried out within the above-defined ranges.

In addition, since the basic catalyst has a melting point of 50-115° C., it is most preferred to maintain a temperature of 120-150° C. for the purpose of easy handling in a continuous process.

Step 1) may further include a step of carrying out heating at 160-170° C. for 1-5 hours to complete the reaction.

However, since excessive increase in the temperature of the reactor 10 during step 1) causes rapid increase in reaction rate, the basic catalyst may be decomposed due to overheating. Therefore, it is preferred that the reactor 10 is not heated by an additional heating unit, unless the temperature is decreased significantly. For example, since an exothermic reaction proceeds after the addition of the alkali metal, the temperature may be controlled by adjusting the rate of introducing the alkali metal depending on temperature. For example, the total content of the alkali metal may be divided so that it may be added several times with predetermined time intervals. In addition, when the temperature of the reactor 10 exceeds 180° C., the reaction temperature may be reduced by supplying nitrogen gas to the reactor 10 through the first supplying line 11.

The reaction of step 1) is an exothermic reaction and hydrogen gas may be generated during the reaction. Since there is a risk of explosion, the hydrogen gas may be vented out through the second discharging line 18 by way of the first to third conveying lines 13-16 connected to the top of the reactor 10.

In step 1) or step 2), a viscosity-reducing agent may further be used. The viscosity-reducing agent is not particularly limited as long as it is one used conventionally in the art. Specifically, the viscosity-reducing agent may be tetraalkoxysilane. When tetraalkoxysilane is added as the viscosity-reducing agent, alcohol may be generated, which increases the reaction rate in step 1) or step 2). Thus, the addition of tetraalkoxysilane may be considered in order to control the reaction rate. After mixing the basic catalyst with tetraalkoxysilane, a compound represented by the following Chemical Formula 4 may be produced:

[Chemical Formula 4]

In Chemical Formula 4, $R_1$ represents any one selected from C1-C5 linear hydrocarbon groups and C3-C5 branched hydrocarbon groups, and $R_3$ represents a substituent derived from alcohol and may be any one selected from C1-C2 alkyl groups. In addition, n is an integer of 2-3, and x is an integer of 1-4.

Since the compound represented by Chemical Formula 4 is in steady state, it acts again as a catalyst, even after the compound represented by Chemical Formula 1 reacts with the tetraalkoxysilane to produce the compound represented by Chemical Formula 4.

The basic catalyst synthesized from the above-mentioned process is stored in the reactor 10, and then is mixed with the alcohol supplied from the first supplying line 11 and the silicon metal supplied from the second supplying line 12 to perform reaction, thereby producing tetraalkoxysilane continuously (step 2; Reaction Scheme 2).

The first supplying line 11 may be a single line or multiple lines, and may be connected to the bottom of the reactor 10.

An alkoxyalkali metal salt is produced from the ion-exchange reaction between the hydrogen of the alcohol and the alkali metal ion of the basic catalyst, and then tetraalkoxysilane is produced from the reaction between the alkoxyalkali metal salt and the silicon metal.

[Reaction Scheme 2]

In Reaction Scheme 2, M may be alkali metal, $R_1$ may represent any one selected from C1-C5 linear hydrocarbon groups and C3-C5 branched hydrocarbon groups, and $R_3$ may represent any one selected from C1-C2 alkyl groups. In addition, n is an integer of 2-3.

In Reaction Scheme 2, $R_1$ may represent any one selected from C1-C5 linear hydrocarbon groups and C3-C5 branched hydrocarbon groups and $R_2$ may represent any one selected from H and C1-C3 alkyl groups. Particularly, $R_1$ may be methyl or ethyl group, and $R_2$ may be H or methyl group.

Specifically, in Reaction Scheme 2, $R_3$ may be selected from C1-C2 alkyl groups.

In addition, in Reaction Scheme 2, in terms of control of the reaction temperature, it is preferred that the number of carbon atoms in $R_1$ is equal to or larger than the number of carbon atoms in $R_3$. In addition, it is more preferred that $R_1$ is the same as $R_3$, since the production of byproducts is minimized in this case.

Since $R_3$—O-M, which is produced from the metal-H reaction of basic catalysts with alcohol, shows higher reactivity as compared to the basic catalyst, the nucleophilic attack reaction of Si—Si bond may prefer during the preparation of tetraalkoxysilane as compared to the reaction with the basic catalyst. However, it is expected that the main chemical reaction mechanism is the reaction between $R_3$—O-M and the silicon metal (Si—Si).

First, $R_3$—O-M is produced from M-H exchange reaction between the basic catalyst and the alcohol ($R_3$—O—H). Then, the Si—Si bonding of the silicon metal is cleaved and $R_3$—O—Si and Si-M bonds are formed. The Si-M bond reacts with the alcohol ($R_3$—O—H) to produce Si—H and M-O—$R_3$ bond. And, the Si—H bond reacts with the $R_3$—O-M to give Si—OR and M-H bonds. M-H reacts with $R_3$—O—H to produce $R_3$—O-M and $H_2$ gas.

Tetraalkoxysilane represented by Chemical Formula 5 is produced through this mechanism.

[Chemical Formula 5]

wherein $R_3$ may be selected from C1-C2 alkyl groups.

Then, the basic catalyst represented by Chemical Formula 2, obtained from the above-mentioned process, may be used to produce the tetraalkoxysilane according to the present disclosure.

In other words, the alcohol is supplied from the first supplying line 11 to the reactor 10 and the silicon metal is supplied through the second supplying line 12, and they react with the basic catalyst under inert atmosphere to produce tetraalkoxysilane (step 2).

Step 2) is also carried out under inert atmosphere, and the inert atmosphere is formed using argon or nitrogen gas, which is supplied to the reactor 10 through the first supplying line 11.

According to the present disclosure, the basic catalyst may be used in an amount of 30-75 wt %, preferably specifically 35-70 wt %, and more preferably specifically 50-70 wt %, based on the total volume of the reactor 10. As mentioned above, the basic catalyst may be once synthesized in the reactor 10.

The silicon metal used herein may have a purity of 98% or higher. When the silicon metal has a purity lower than 98%, impurities containing iron and other metals may be generated undesirably. Thus, it is preferred to use silicon metal having a purity of 98% or higher. Considering cost efficiency, it is more preferred to use silicon metal having a purity of 98-99%.

In addition, the silicon metal used herein may have an average particle size of 20-800 nm.

The silicon metal may be used in an amount of 25-70 wt %, preferably specifically 25-70 wt %, based on the total volume of the reactor 10.

Additionally, the silicon metal used to prepare tetraalkoxysilane may be subjected to reduction of the oxides ($SiO_X$) present on the surface thereof. Particularly, the oxides ($SiO_X$) present on the surface of silicon metal may be reduced and removed by treating them with a mixed gas containing at least one selected from the group consisting of mixed gases of hydrogen gas with inert gas such as argon gas or nitrogen gas at the temperature of 400-600° C.

The reduction reaction step may be carried out for 2-5 hours, but the time may be controlled suitably depending on the amount of the silicon metal used. When the oxides present on the surface of silicon metal remain without being removed, the yield and purity of tetraalkoxysilane may be decreased undesirably.

The silicon metal particles may be used in an amount of 30-65 wt %, preferably 30-50 wt %, based on the total volume of the reactor 10. In the continuous process for production of tetraalkoxysilane, the silicon metal is preferred to be continuously supplied in about the same amount of its consumption.

The alcohol used herein may be represented by Chemical Formula 3 ($R_3OH$), wherein $R_3$ may be any one selected from C1-C2 alkyl groups like methanol or ethanol. It is preferred to use absolute alcohol. The alcohol vaporized in pre-heating zone is continuously supplied to the reactor 10. The first supplying line 11 may have a temperature of 100° C. or higher, preferably 100-190° C.

According to the present disclosure, solvent is not used, except alcohol. For effective control of the reaction rate and the reaction heat of the solvent, nitrogen gas may be supplied together with alcohol through the first supplying line 11. In this manner, it is possible to control the time required for preparing the catalyst and to carry out the alkoxylation of the silicon metal stably.

Step 2) may be carried out at a temperature of 120-190° C., preferably specifically 140-185° C. It is because alcohol is maintained in vaporized state at a temperature of 100° C. or higher. In addition, in consideration of the yield of tetraalkoxysilane, it is more preferred that step 2) is carried out at 140-160° C. for tetramethoxysilane and at 170-185° C. for tetraethoxysilane.

Then, the tetraalkoxysilane produced from the reaction in the reactor 10 is subjected to a separation step. To carry out the separation step, the apparatus is equipped with a separation unit 20, a recovery unit 30 and a condenser unit 40.

The produced vapor containing tetraalkoxysilane is supplied to the separation unit 20 through the first conveying lime 13. At this time, the product tetraalkoxysilane is present in the state of reaction mixture, and is maintained at a temperature ranging from the boiling point of tetraalkoxysilane to its higher 10° C. The tetraalkoxysilane, the other byproducts and unreacted alcohol are supplied to the recovery unit 30 through the second conveying line 15. From the vaporized compounds containing tetraalkoxysilane, the higher oilers having a temperature of higher 10° C. above than boiling point of tetraalkoxysilane are condensed immediately and returned to the reactor 10 through the first recycling line 14. For this, the temperature is maintained in a range of 130-179° C., preferably at the temperature of higher 10° C. above than boiling point of tetraalkoxysilane, so that the product maintains in vaporized state.

From the reaction mixture supplied through the second conveying line 15, the product mixture is discharged and recovered through the first discharging line 17. The lower boiling compounds including unreacted alcohol are supplied to the condenser unit 40 configured to carry out cooling to room temperature, through the third conveying line 16. At this time, hydrogen gas vents out through the third discharging line 18, and unreacted alcohol is condensed and may be recycled after being returned to the reactor 10 through the second recycling line 19. The product, tetraalkoxysilane, supplied from the first discharging line 17 has a high purity of 80% or higher and may be obtained with a purity of 99% or higher through fractional distillation.

Particularly, the reaction mixture is introduced into the recovery unit 30 through the second conveying line 15. The recovery unit 30 is maintained at the boiling point of alcohol or a slightly higher temperature so that the tetraalkoxysilane product and the unreacted alcohol are separated from the reaction mixture.

Therefore, according to an embodiment of the present disclosure, since use of a solvent is avoided in the process for preparing tetraalkoxysilane, the concentration of the catalyst can be maximized, and reaction heat can also be easily dissipated. Further, the formation of byproducts can be minimized and, and tetraalkoxysilane can be obtained in better yield.

Furthermore, processing efficiency can be maximized since the basic catalyst and the tetraalkoxysilane can be produced simultaneously in a single processing apparatus.

When the basic catalyst according to the present disclosure is used, reaction can be carried out more stably, and reaction yield and reactivity may be improved. It is also possible to obtain high-purity tetraalkoxysilane with higher cost efficiency through the method disclosed herein, as compared to the related art.

Conventionally, tetraalkoxysilane is prepared by the direct reaction of silicon metal with alcohol. In this conventional technique, the yield of tetraalkoxysilane may be low due to solvent decomposition and resultant byproduct formation. As a purification step for increasing purity is required to remove various byproducts, processing cost may increase. On the contrary, the present invention is advantageous in that cost can be saved significantly since tetraalkoxysilane can be prepared with 80% or higher through a highly effective and simplified process for preparing tetraalkoxysilane.

The examples and experiments will now be described. The following examples and experiments are for illustrative purposes only and not intended to limit the scope of this disclosure.

Example 1-1. Preparation of Basic Catalyst ($CH_3O(CH_2CH_2O)_2$—Na)

A 100-mL two-neck round-bottom flask and a heating mantle were mounted to a magnetic agitator (Heidolph MR 3000). A condenser was connected to the central inlet, and dry $N_2$ gas was allowed to flow to dry the reaction apparatus. Next, a magnetic bar (Cowie Co., 20×10 mm) and 3.32 g (84.9 mmol) of sodium (Na) were introduced through the remaining inlet and the inlet was sealed with a rubber stopper. Then, a basic catalyst ($CH_3O(CH_2CH_2O)_2$—Na) was prepared by conducting reaction by immediately (1-3 seconds) introducing 10 mL (10.2 g, 84.9 mmol) of diethylene glycol monomethyl ether through the rubber stopper by using a syringe. The reaction was an exothermic reaction. The reaction temperature reached 187° C. 15 minutes later, and then was decreased.

The basic catalyst was present as a clear suspension at 57° C. or higher and turned viscous at a temperature lower than 40° C., resulting in a paste. In other words, it can be seen that the basic catalyst ($CH_3O(CH_2CH_2O)_2$—Na) according to Example 1-1 can be handled with ease at 57° C. or higher.

Example 1-2. Preparation of Basic Catalyst ($CH_3O(CH_2CH_2O)_2$—K)

A basic catalyst ($CH_3O(CH_2CH_2O)_2$—K) was obtained in the same manner as Example 1-1, except that 3.32 g (84.9 mmol) of potassium was used instead of sodium (Na). The reaction was an exothermic reaction. The reaction temperature reached 146° C. 10 minutes later, and then was decreased.

The basic catalyst was present as a clear suspension at 70° C. or higher and turned viscous at a temperature lower than 60° C., resulting in a paste. In other words, it can be seen that the basic catalyst ($CH_3O(CH_2CH_2O)_2$—K) according to Example 1-2 can be handled with ease at 70° C. or higher.

Example 1-3. Preparation of Basic Catalyst ($C_2H_5O$ $(CH_2CH_2O)_2$—Na)

A basic catalyst ($C_2H_5O(CH_2CH_2O)_2$—Na) was obtained in the same manner as Example 1-1, except that 1.71 g (74.4 mmol) of sodium metal was added instead of 3.32 g (84.9 mmol) of sodium metal, and 10 mL (9.99 g, 74.4 mmol) of diethylene glycol monoethyl ether was introduced instead of diethylene glycol monomethyl ether. The reaction was an exothermic reaction. The reaction temperature increased to 164° C. 20 minutes later, and then was decreased.

The basic catalyst turned into a white slurry when the temperature was decreased to about 40-60° C., and could not be agitated with the magnetic agitator. When heated again to 60° C. or higher, the basic catalyst turned into a white suspension and could be agitated. In other words, it can be seen that the basic catalyst ($C_2H_5O(CH_2CH_2O)_2$—Na) according to Example 1-3 can be handled with ease at 60° C. or higher.

Example 1-4. Preparation of Basic Catalyst ($C_2H_5O$ $(CH_2CH_2O)_2$—K)

A basic catalyst ($C_2H_5O(CH_2CH_2O)_2$—K) was obtained in the same manner as Example 1-1, except that 2.91 g (74.4 mmol) of potassium metal was added instead of 3.32 g (84.9 mmol) of sodium metal, and 10 mL (9.99 g, 74.4 mmol) of diethylene glycol monoethyl ether was introduced instead of diethylene glycol monomethyl ether. The reaction was an exothermic reaction. The reaction temperature increased to 105° C. 4 minutes later, and then was decreased.

The basic catalyst was present as a white suspension at 105° C. or higher, and turned viscous at a temperature lower than 105° C., resulting in a white paste state. In other words, it can be seen that the basic catalyst ($C_2H_5O(CH_2CH_2O)_2$—K) according to Example 1-4 can be handled with ease at 115° C. or higher.

Example 1-5. Preparation of Basic Catalyst ($CH_3$ $(CH_2)_3O(CH_2CH_2O)_2$—Na)

A basic catalyst ($CH_3(CH_2)_3O(CH_2CH_2O)_2$—Na) was obtained in the same manner as Example 1-1, except that 1.35 g (58.6 mmol) of sodium metal was added instead of 3.32 g (84.9 mmol) of sodium metal, and 10 mL (9.5 g, 58.6 mmol) of diethylene glycol monobutyl ether was introduced instead of diethylene glycol monomethyl ether. The reaction was an exothermic reaction. The reaction temperature reached 43° C. 10 minutes later, and then was decreased.

The reactor was heated to 150° C. through the heating unit coupled to one side of the reactor to complete the reaction. Then, phase change was checked while lowering the temperature.

The basic catalyst was present as a black suspension at 50° C. or higher, and turned viscous at a temperature lower than 40° C., resulting in a black paste state. In other words, it can be seen that the basic catalyst ($CH_3(CH_2)_3O$ $(CH_2CH_2O)_2$—Na) according to Example 1-5 can be handled with ease at 50° C. or higher.

Example 1-6. Preparation of Basic Catalyst ($CH_3$ $(CH_2)_3O(CH_2CH_2O)_2$—K)

A basic catalyst ($CH_3(CH_2)_3O(CH_2CH_2O)_2$—K) was obtained in the same manner as Example 1-1, except that 2.29 g (58.6 mmol) of potassium metal was added instead of sodium metal, and 10 mL (9.5 g, 58.6 mmol) of diethylene glycol monobutyl ether was introduced instead of diethylene glycol monomethyl ether. The reaction was an exothermic reaction. The reaction temperature reached 78° C. 10 minutes later, and then was decreased. The reactor was heated to 150° C. through the heating unit coupled to one side of the reactor to complete the reaction.

The basic catalyst was converted into a black paste state at around 50° C. and could not be agitated with ease. In other words, it can be seen that the basic catalyst ($CH_3(CH_2)_3O$ $(CH_2CH_2O)_2$—K) according to Example 1-6 can be handled with ease at 50° C. or higher.

Example 2-1. Preparation of Tetramethoxysilane (2-L Reactor)

A process for preparing tetraalkoxysilane using a 2-L reactor was designed as follows. First, a 2-L baffle-type reactor 10 capable of agitation was prepared and the inside of the reactor was filled with nitrogen. Next, 1000.0 g (8.32 mmol) of diethylene glycol monomethyl ether was introduced and 191.3 g (8.32 mmol) of sodium (Na) metal was added gradually in such a manner that the reactor might not be overheated due to an exothermic reaction. In this manner, a basic catalyst of $CH_3O(CH_2CH_2O)_2$—Na was obtained. The reactor 10 reached 100° C. due to the exothermic reaction.

Next, 750 g of silicon metal particles (20-800 μm) were introduced to the reactor 10. The silicon metal used was one treated with 10% hydrogen/90% argon mixed gas at 400° C. to reduce and remove the oxides ($SiO_x$) on the silicon metal surface.

The first supplying line 11 and the separation unit 20 were connected to the reactor 10, and a heating jacket and a heat insulation unit were installed in each of the first supplying line 11 and the separation unit 20 to control temperature.

The reactor 10 was maintained at a temperature of 122-150° C. and the first supplying line 11 was heated to 110° C. by the heating unit.

Then, methanol was supplied continuously to the reactor 10 at a rate of 2 mL/min (about 2.97 mol/hr) through the first supplying line 11 to synthesize tetraalkoxysilane through the direct catalytic reaction of the basic catalyst ($CH_3O$ $(CH_2CH_2O)_2$—Na) with silicon metal and methanol. The direct reaction was an exothermic reaction, and the internal temperature of the reactor 10 was increased rapidly. Therefore, in order to prevent overheating of the reactor 10, nitrogen gas ($N_2$ gas) was supplied into the reactor 10 at a rate of 10 mL/min through the alcohol supplying line, when the internal temperature of the reactor 10 was 140° C. or higher. Then, when the reactor 10 was stabilized at an adequate temperature (140-150° C.), the alcohol supply was stopped. In this process, 2.6 mol/hr of methanol was supplied and 0.50 mol/hr of tetramethoxysilane was obtained on average.

The reaction mixture obtained from the reactor 10 was supplied to the recovery unit 30 maintained at 70° C. through the separation unit 20, and the product, tetramethoxysilane, was collected through the first discharging line 17 and the remaining unreacted methanol and hydrogen gas were conveyed to the condenser unit 40 through the third conveying line 16. The hydrogen gas was discharged, and the unreacted methanol was recovered and recycled to the reactor 10 through the second recycling line 19. All the reactions were carried out under complete nitrogen environment.

Example 2-2. Preparation of Tetraethoxysilane (Scaled-Up to 50 L)

In order to test continuous production of tetraalkoxysilane, a 50-L reactor was prepared (see, FIG. 1). Tetraalkoxysilane was produced continuously through direct reaction of silicon metal with ethanol by adding silicon metal and ethanol to the reactor 10.

Before the synthesis of tetraalkoxysilane, nitrogen atmosphere was formed in the reactor 10 having a volume of 50 L, and 21 L (20,790 g, 155 mol) of 99% diethylene glycol monoethyl ether was added to prepare a basic catalyst. Then, 3.562 kg (155 mol) of sodium metal was added by piecemeals of 1.781 kg with 10-hour intervals. At this time, nitrogen ($N_2$) gas was supplied at a rate of 20 mL/min through the first supplying line 11 in order to prevent overheating caused by the exothermic reaction. The amount of the nitrogen ($N_2$) gas or the addition rate of the sodium metal could be controlled depending on the temperature increased by overheating.

In addition, alkali metal other than the sodium metal may also be used. In this case, it is preferred that the reactor 10 is maintained at a temperature equal to or higher than the melting point of the alkali metal in order to accelerate the reaction rate of the synthesis of a basic catalyst and to ensure flowability. For example, since each of the basic catalysts according to Examples 1-1 to 1-6 can be handled easily at a temperature ranging from 50° C. to 115° C., it is preferred that the reactor 10 is maintained at a temperature of 110° C. or higher, more specifically at 100-190° C., and most specifically at 120-150° C.

In this example, the addition of the sodium metal was started when the temperature of the reactor 10 was room temperature. As the reaction proceeded, the temperature was increased to 130° C. When the increase in temperature in the reactor was nearly stopped, the temperature was controlled to 150° C. by using the heating unit coupled to the exterior of the reactor 10 to accelerate the reaction rate of the catalyst synthesis, thereby providing a basic catalyst ($C_2H_5O(CH_2CH_2O)_2$—Na).

Then, the temperature of the reactor 10 was lowered to 130° C., and 13.5 kg of particulate silicon metal (20-800 μm) was introduced. The silicon metal was introduced continuously to the reactor 10 through the second supplying line 12. It is preferred that the input amount of the silicon metal is the same as the amount of the consumed silicon metal.

The silicon metal used herein was one subjected to a reduction process to remove the oxides ($SiO_2$) present on the silicon metal surface by allowing 10% hydrogen/90% argon mixed gas to flow at 400° C. for about 3-4 hours.

After that, the first supplying line 11 was heated to 110° C. and 99.9% anhydrous ethanol was supplied to the reactor 10 at a rate of 10-20 g/min through the heated first supplying line 11. Since the first supplying line was heated to high temperature, the anhydrous ethanol was vaporized while passing through the first supplying line 11. As a result, vaporized ethanol was supplied to the reactor 10.

Since the reaction is an exothermic reaction, it cause increase in temperature. Thus, nitrogen gas was supplied through the first supplying line 11. The reactor 10 does not undergo significant increase in temperature due to the introduced nitrogen gas. Therefore, the reactor 10 was maintained at 175-180° C. by the external heating unit. When the temperature of the reactor 10 was stabilized at 175-180° C., the supply of nitrogen gas was stopped.

Through this reaction, tetraethoxysilane was produced continuously. Since the produced tetraethoxysilane is in vaporized state and takes vaporization heat, it is preferred that the temperature of the reactor 10 is maintained continuously at 175-180° C. If the temperature of the reactor 10 is lower than the above-defined range, tetraethoxylsilane cannot maintain its vaporized state, resulting in significant decrease in yield. In addition, if the temperature of the reactor 10 is higher than the above-defined range, the basic catalyst may be decomposed. Thus, it is most preferred that the reactor 10 is maintained at the above-defined range of temperature.

Figure 2:
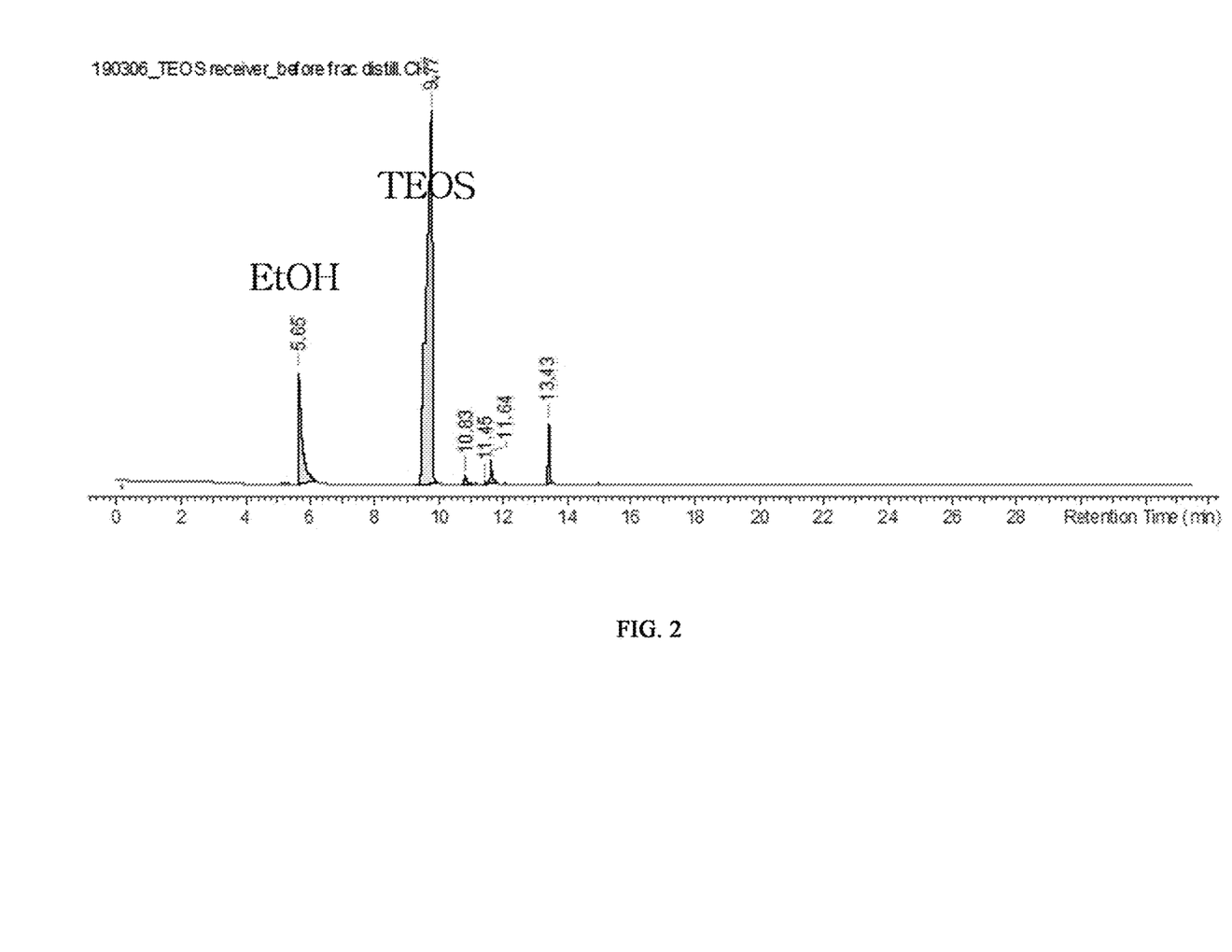
FIG. 2 is a graph illustrating the results of gas chromatography (GC) analysis of tetraethoxysilane obtained in Example 2-2.

The vaporized reaction mixture (containing tetraethoxysilane) was conveyed to the first separation unit 20, and then to the recovery unit 30 maintained at 80° C., through the first conveying line 13. The high-boiling-point product, tetraethoxysilane, was collected through the first discharging line 17 and the remaining unreacted ethanol and hydrogen gas were supplied to the condenser unit 40 through the third conveying line 16. The hydrogen gas was discharged through the second discharging line and the unreacted ethanol could be recycled to the reactor 10 through the second recycling line 19. It was shown that tetraethoxysilane produced from the reactor 10 shows a yield of 1.6 kg/h per 1.9 kg/h of ethanol supplied. The total amount of the product collected through the first discharging line 17 was 2.0 kg/h. The gas chromatography (GC) analysis of the product showed that the product included 80% (1.6 kg) of tetraethoxysilane (TEOS), 0.1% (2 g) of "BuOSi(OEt)$_3$, 0.5% (10 g) of (EtO)$_3$SiOSi(OEt)$_3$, and 1.4% (28 g) of $C_2H_5OCH_2CH_2OCH_2CH_2OSi(OC_2H_5)_3$ (FIG. 2). The silicon metal particles were supplied to the reactor 10 at a rate of 0.22 kg/h through the second supplying line 12.

The tetraethoxysilane separated from the recovery unit 30 was isolated through the first discharging line 17, and the unreacted alcohol and hydrogen gas were conveyed to the condenser unit 40 maintained at 80° C. through the third conveying line 16. The hydrogen gas was discharged through the second discharging line 18 and the unreacted ethanol was recycled to the reactor 10 through the second recycling line 19. The reaction tetraethoxysilane-containing product, which was obtained through the recovery unit 30, was subjected to fractional distillation to obtain high-purity (99% or higher) tetraethoxysilane.

Figure 3:
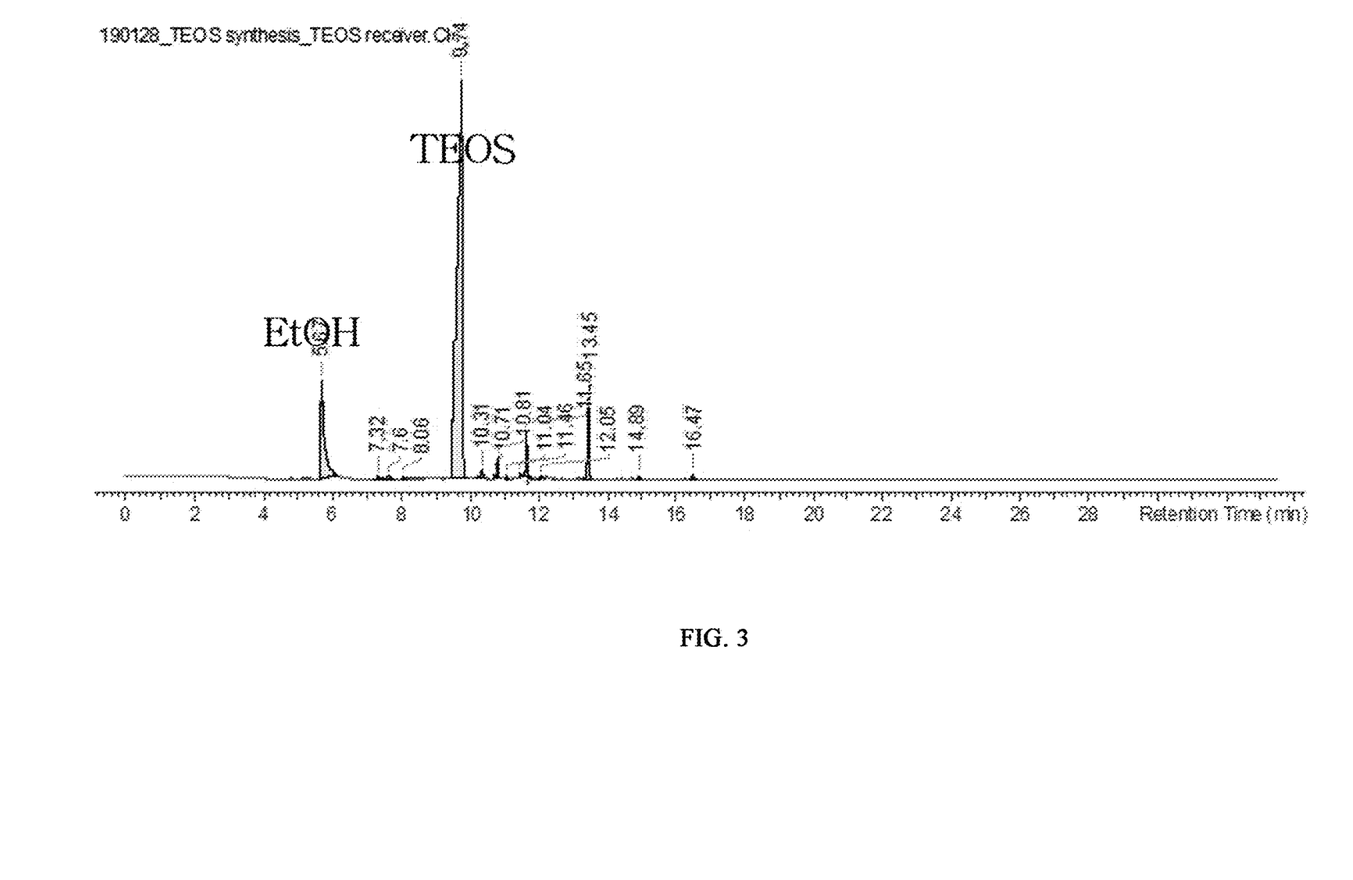
FIG. 3 is a graph illustrating the results of gas chromatography (GC) analysis of tetraethoxysilane obtained in Comparative Example 1-1.

Comparative Example 1-1. Preparation of Tetraethoxysilane Using Basic Catalyst ($C_2H_5O$ ($CH_2CH_2O)_2$—Na) Containing 19% of Solvent Reaction was carried out by using the same apparatus and method as Example 2-2, except that $C2H_5O(CH_2CH_2O)_2$—H was introduced in an amount of 25 L (24.75 kg, 184.5 mol) corresponding to 19% excess based on the originally used amount in the preparation of the basic catalyst ($C_2H_5O(CH_2CH_2O)_2$—Na). The reaction for preparing tetraethoxysilane was also carried out in the same manner. It was shown that tetraethoxysilane produced from the reactor 10 shows a yield of 1.46 kg/h per 1.8 kg/h of ethanol supplied. The total amount of the product collected through the first discharging line 17 was 2.01 kg/h. The GC analysis of the product showed that the product included 72.6% (1.46 kg) of tetraethoxysilane (TEOS), 14% (281 g) of ethanol, 0.8% (16 g) of "BuOSi(OEt)$_3$, 0.8% (16 g) of EtOCH$_2$CH$_2$OSi(OEt)$_3$, 2.0% (40 g) of (EtO)$_3$SiOSi(OEt)$_3$, 6.0% (121 g) of C$_2$H$_5$OCH$_2$CH$_2$OCH$_2$CH$_2$OSi(OC$_2$H$_5$)$_3$, 0.3% (6 g) of 1,1-diethoxyethane, 0.3% (6 g) of 2-ethoxy-ethyl vinyl ether, and many other solvent decomposition products (FIG. 3).

Comparative Example 1-2. Preparation of Tetra-ethoxysilane Using Basic Catalyst (C$_2$H$_5$O (CH$_2$CH$_2$O)$_2$—Na) Containing 40% of Solvent Reaction was carried out by using the same apparatus and method as Example 2-2, except that C2H$_5$O(CH$_2$CH$_2$O)$_2$—H was introduced in an amount of 29.4 L (29.1 kg, 214.0 mol) corresponding to 40% excess based on the originally used amount in the preparation of the basic catalyst (C$_2$H$_5$O(CH$_2$CH$_2$O)$_2$—Na). The reaction for preparing tetraethoxysilane was also carried out in the same manner.

Figure 4:
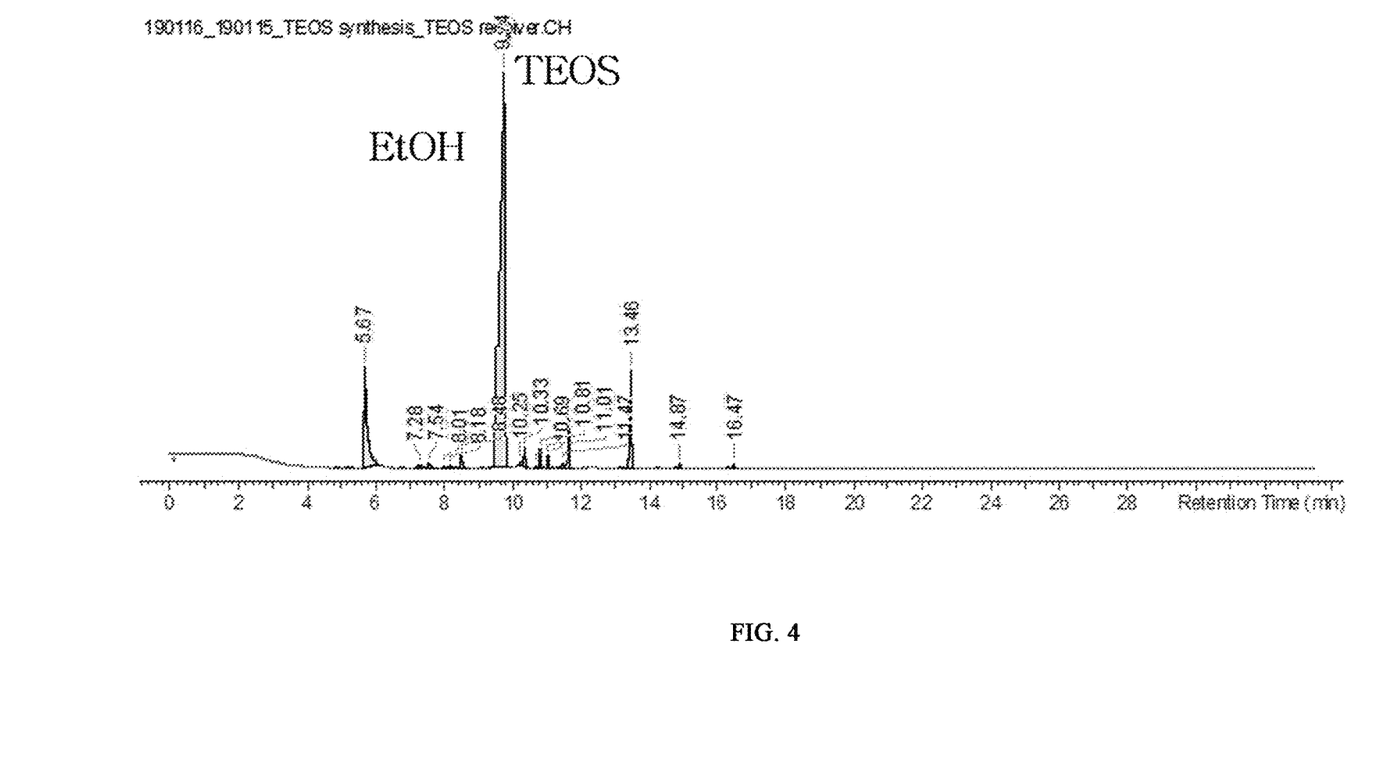
FIG. 4 is a graph illustrating the results of gas chromatography (GC) analysis of tetraethoxysilane obtained in Comparative Example 1-2.

It was shown that tetraethoxysilane produced from the reactor 10 shows a yield of 1.45 kg/h per 1.8 kg/h of ethanol supplied. The total amount of the product collected through the first discharging line 17 was 2.03 kg/h. The GC analysis of the product showed that the product included 71% (1.45 kg) of tetraethoxysilane (TEOS), 14% (0.284 kg) of ethanol, 0.3% (6 g) of "BuOSi(OEt)$_3$, 0.9% (18 g) of EtOCH$_2$CH$_2$OSi(OEt)$_3$, 2.0% (40 g) of (EtO)$_3$SiOSi(OEt)$_3$, 7.0% (142 g) of C$_2$H$_5$OCH$_2$CH$_2$OCH$_2$CH$_2$OSi(OC$_2$H$_5$)$_3$, 0.3% (6 g) of 1,1-diethoxyethane, 0.3% (6 g) of 2-ethoxy-ethyl vinyl ether, and many other unidentified products generated by solvent decomposition (FIG. 4).

Test Example 1. Analysis of Purity Depending on Use of Solvent in Preparation of Basic Catalyst The tetraethoxysilane obtained from each of Example 2-2, Comparative Example 1-1 and Comparative Example 1-2 was analyzed by gas chromatography (GC).

FIG. 2 is a graph illustrating the result of gas chromatography (GC) analysis of the tetraethoxysilane obtained according to Example 2-2. FIG. 3 is a graph illustrating the result of gas chromatography (GC) analysis of the tetraethoxysilane obtained according to Comparative Example 1-1. FIG. 4 is a graph illustrating the result of gas chromatography (GC) analysis of the tetraethoxysilane obtained according to Comparative Example 1-2. As can be seen from the results, the tetraethoxysilane obtained from Example 2-2 has a purity of 80% or higher and contains impurities in an amount less than 20%. Most of the impurities included ethanol, and non-identified materials were nonexistent. Thus, it is possible to increase the purity to 99% through a simple purification process.

On the contrary, it can be seen that, when tetraethoxysilane was obtained by the methods using a solvent according to Comparative Examples 1-1 and 1-2, the obtained tetraethoxysilane had a purity of 71-72.6% and the product included unreacted alcohol and byproducts in an amount of 27.4-29%. Moreover, various byproducts other than ethanol were present and there were also non-identified products. Thus, it is essentially required to carry out a purification process in order to provide industrially applicable tetraethoxysilane. If the byproducts are diverse, fine purification process is required which leads to increase in processing time and cost.

In addition, it can be seen that the contents of the byproducts are increased in the processes of Comparative Example 1-2 wherein the solvent content was higher as compared to Comparative Example 1-1.

In addition, although detailed test results are not described herein, it was found out that the formation of byproducts can be decreased when the molar ratio of the compound represented by Chemical Formula 1 to the alkali metal was 1.0:1.0-1.1. It was also found out that, the formation of byproducts increases abruptly, and that some of byproducts could not be removed with known purification processes such as fractional distillation, when the molar ratio was outside the above-defined range.

DESCRIPTION OF DRAWING NUMERALS

| | | | |
|---|---|---|---|
| 10: | Reactor | 11: | First supplying line |
| 12: | Second supplying line | 13: | First conveying line |
| 14: | First recycling line | 15: | Second conveying line |
| 16: | Third conveying line | 17: | First discharging line |
| 18: | Second discharging line | 19: | Second recycling line |
| 20: | Separation unit | 30: | recovery unit |
| 40: | Condenser unit | | |

What is claimed is:

1. A method for producing tetraalkoxysilane, comprising:
reacting a compound represented by Chemical Formula 1 below with an alkali metal to produce a basic catalyst represented by Chemical Formula 2 below; and
mixing the basic catalyst represented by Chemical Formula 2, silicon metal, and an alcohol represented by i-Chemical Formula 3 below to produce tetraalkoxysilane:

Chemical Formula 1

Chemical Formula 2

Chemical Formula 3 where M is alkali metal,
$R_1$ represents a C1-C5 linear hydrocarbon group or a C3-C5 branched hydrocarbon group,
$R_2$ represents H or a C1-C3 linear hydrocarbon group,
$R_3$ represents a C1-C2 alkyl group, and
n is an integer of 2-3,
wherein the silicon metal is employed in the mixing step after reducing and removing oxides (SiO$_x$) present on the surface thereof by treating with a mixed gas of hydrogen and an inert gas selected from the group consisting of argon, nitrogen, or combinations thereof at a temperature ranging from 400 to 600° C.

2. The method for producing tetraalkoxysilane according to claim 1, wherein $R_1$ represents a C1—C3 alkyl group and $R_2$ represents H or a C1-C3 alkyl group in Chemical Formula 1 or 2.

3. The method for producing tetraalkoxysilane according to claim 1, wherein n is 2 in Chemical Formula 1 or 2.

4. The method for producing tetraalkoxysilane according to claim 1, wherein the compound represented by Chemical Formula 1 and the alkali metal are present during reacting to produce the basic catalyst at a molar ratio of 1.0:1.0 to 1.0:1.1.

5. The method for producing tetraalkoxysilane according to claim 1, wherein the compound represented by Chemical Formula 1 and the alkali metal are present during reacting to produce the basic catalyst at a molar ratio of 1:1.

6. The method for producing tetraalkoxysilane according to claim 1, wherein reacting to produce the basic catalyst is carried out at a temperature ranging from 100 to 190° C. for from 1 to 20 hours.

7. The method for producing tetraalkoxysilane according to claim 1, wherein the alkali metal is Li, Na or K.

8. The method for producing tetraalkoxysilane according to claim 1, wherein reducing oxides present on the surface of the silicon metal is carried out for from 2 to 5 hours.

9. The method for producing tetraalkoxysilane according to claim 1, wherein $R_1$ of the basic catalyst represented by Chemical Formula 2 is the same as $R_3$ of the alcohol represented by Chemical Formula 3.

10. The method for producing tetraalkoxysilane according to claim 1, wherein mixing to produce tetraalkoxysilane is carried out at a temperature ranging from 140 to 185° C.

11. The method for producing tetraalkoxysilane according to claim 1, wherein reacting to produce the basic catalyst and mixing to produce tetraalkoxysilane are carried out under an inert atmosphere of argon gas or nitrogen gas.

* * * * *